United States Patent
Sumi et al.

(10) Patent No.: US 8,674,956 B2
(45) Date of Patent: Mar. 18, 2014

(54) IN-CELL TOUCH SENSOR TOUCH AREA ENHANCING ALGORITHM

(75) Inventors: Naoki Sumi, Chu-Nan (TW); Yoshikazu Matsui, Chu-Nan (TW)

(73) Assignee: Chimei Innolux Corporation, Chu-Nan (TW)

( * ) Notice: Subject to any disclaimer, the term of this patent is extended or adjusted under 35 U.S.C. 154(b) by 176 days.

(21) Appl. No.: 13/158,924

(22) Filed: Jun. 13, 2011

(65) Prior Publication Data

US 2012/0313861 A1    Dec. 13, 2012

(51) Int. Cl.
*G06F 3/041* (2006.01)
*G06F 3/045* (2006.01)
*G06F 3/044* (2006.01)
*G06K 11/06* (2006.01)

(52) U.S. Cl.
USPC ..... 345/173; 345/174; 178/18.01; 178/18.02; 178/18.06

(58) Field of Classification Search
USPC ............ 345/173–174, 178; 178/18.01, 18.02, 178/18.06
See application file for complete search history.

(56) References Cited

U.S. PATENT DOCUMENTS

| | | | | |
|---|---|---|---|---|
| 5,648,642 A * | 7/1997 | Miller et al. | ............... | 178/18.06 |
| 5,675,130 A * | 10/1997 | Sekizawa | .................... | 178/18.07 |
| 6,411,283 B1 * | 6/2002 | Murphy | ........................ | 345/173 |
| 6,727,892 B1 * | 4/2004 | Murphy | ........................ | 345/173 |
| 7,164,430 B2 * | 1/2007 | Jiao et al. | ...................... | 345/611 |
| 7,304,638 B2 * | 12/2007 | Murphy | ........................ | 345/173 |
| 7,990,368 B2 * | 8/2011 | Lee et al. | ....................... | 345/178 |
| 8,294,687 B1 * | 10/2012 | Ksondzyk | ..................... | 345/173 |
| 8,338,723 B2 * | 12/2012 | Kim | ........................... | 178/18.03 |
| 8,390,591 B2 * | 3/2013 | Jung | .............................. | 345/173 |
| 8,420,958 B2 * | 4/2013 | Lu et al. | ..................... | 178/18.06 |
| 2002/0122029 A1 * | 9/2002 | Murphy | ........................ | 345/173 |
| 2007/0222766 A1 * | 9/2007 | Bolender | ...................... | 345/173 |
| 2008/0158185 A1 * | 7/2008 | Westerman | ................... | 345/173 |
| 2008/0259044 A1 * | 10/2008 | Utsunomiya et al. | .......... | 345/173 |
| 2008/0309629 A1 * | 12/2008 | Westerman et al. | ........... | 345/173 |
| 2009/0085881 A1 * | 4/2009 | Keam | ............................ | 345/173 |
| 2009/0167724 A1 * | 7/2009 | Xuan et al. | ..................... | 345/175 |
| 2009/0167725 A1 * | 7/2009 | Lee et al. | ....................... | 345/178 |
| 2009/0174675 A1 * | 7/2009 | Gillespie et al. | ............... | 345/173 |
| 2009/0174679 A1 * | 7/2009 | Westerman | .................... | 345/173 |
| 2010/0088632 A1 * | 4/2010 | Knowles et al. | .............. | 715/784 |
| 2010/0090967 A1 * | 4/2010 | Jang | .............................. | 345/173 |
| 2010/0097355 A1 * | 4/2010 | Jang et al. | ..................... | 345/178 |
| 2010/0207893 A1 * | 8/2010 | Yeh et al. | ....................... | 345/173 |
| 2010/0212974 A1 * | 8/2010 | Kim | ........................... | 178/18.03 |
| 2010/0259504 A1 * | 10/2010 | Doi et al. | ....................... | 345/174 |
| 2010/0315372 A1 * | 12/2010 | Ng | ................................. | 345/174 |
| 2011/0007021 A1 * | 1/2011 | Bernstein et al. | .............. | 345/174 |
| 2011/0025636 A1 * | 2/2011 | Ryu et al. | ....................... | 345/173 |

(Continued)

*Primary Examiner* — Matthew Fry
(74) *Attorney, Agent, or Firm* — Liu & Liu (57) ABSTRACT

A touch detection method includes: scanning the row electrodes or the column electrodes in sequence to obtain touch data of the touch sensor; labeling a plurality of coordinates as a touch image according to the touch data; mirror copying the touch data of the touch image corresponding to at least one column electrode and at least one row electrode which are adjacent to an edge of the pixel active area in the x-direction and the y-direction, respectively, to at least one corresponding location which is outside of the touch sensor active area with respect to the edge of the pixel active area; calculating a location ($x_{ave}$, $y_{ave}$) of the central point of the touch image by a weighted average; and outputting the location ($x_{ave}$, $y_{ave}$) of the central point of the touch image.

6 Claims, 8 Drawing Sheets

(56) References Cited

U.S. PATENT DOCUMENTS

| | | |
|---|---|---|
| 2011/0025638 A1* | 2/2011 | Salaverry et al. ............. 345/174 |
| 2011/0037727 A1* | 2/2011 | Lee et al. ....................... 345/174 |
| 2011/0286624 A1* | 11/2011 | Choi et al. .................... 382/100 |
| 2012/0050216 A1* | 3/2012 | Kremin et al. ................ 345/174 |
| 2012/0098759 A1* | 4/2012 | Chang ........................... 345/173 |
| 2012/0105366 A1* | 5/2012 | Lai et al. ....................... 345/174 |
| 2012/0113017 A1* | 5/2012 | Benko et al. .................. 345/173 |
| 2012/0127118 A1* | 5/2012 | Nolting et al. ................ 345/174 |
| 2012/0146938 A1* | 6/2012 | Worfolk et al. ............... 345/174 |
| 2012/0146939 A1* | 6/2012 | Worfolk et al. ............... 345/174 |
| 2012/0188206 A1* | 7/2012 | Sparf et al. .................... 345/175 |
| 2012/0262419 A1* | 10/2012 | Hershman et al. ............ 345/174 |
| 2012/0313861 A1* | 12/2012 | Sumi et al. .................... 345/173 |
| 2012/0319983 A1* | 12/2012 | Bao et al. ...................... 345/173 |

\* cited by examiner

IN-CELL TOUCH SENSOR TOUCH AREA ENHANCING ALGORITHM

BACKGROUND OF THE INVENTION

1. Field of the Invention

The present invention relates to a touch detection method, a touch sensor, and a liquid crystal display device, and in particular relates to a touch detection method, a touch sensor, and a liquid crystal display device, which use an in-cell touch sensor touch area enhancing algorithm.

2. Description of the Related Art

In a touch panel, the electrodes of an in-cell touch sensor (ITS) are basically located at the inside of a pixel active area because of circuit complexity limitations and narrow frame edge requirements for display devices, such as a mobile phone.

Figure 1:
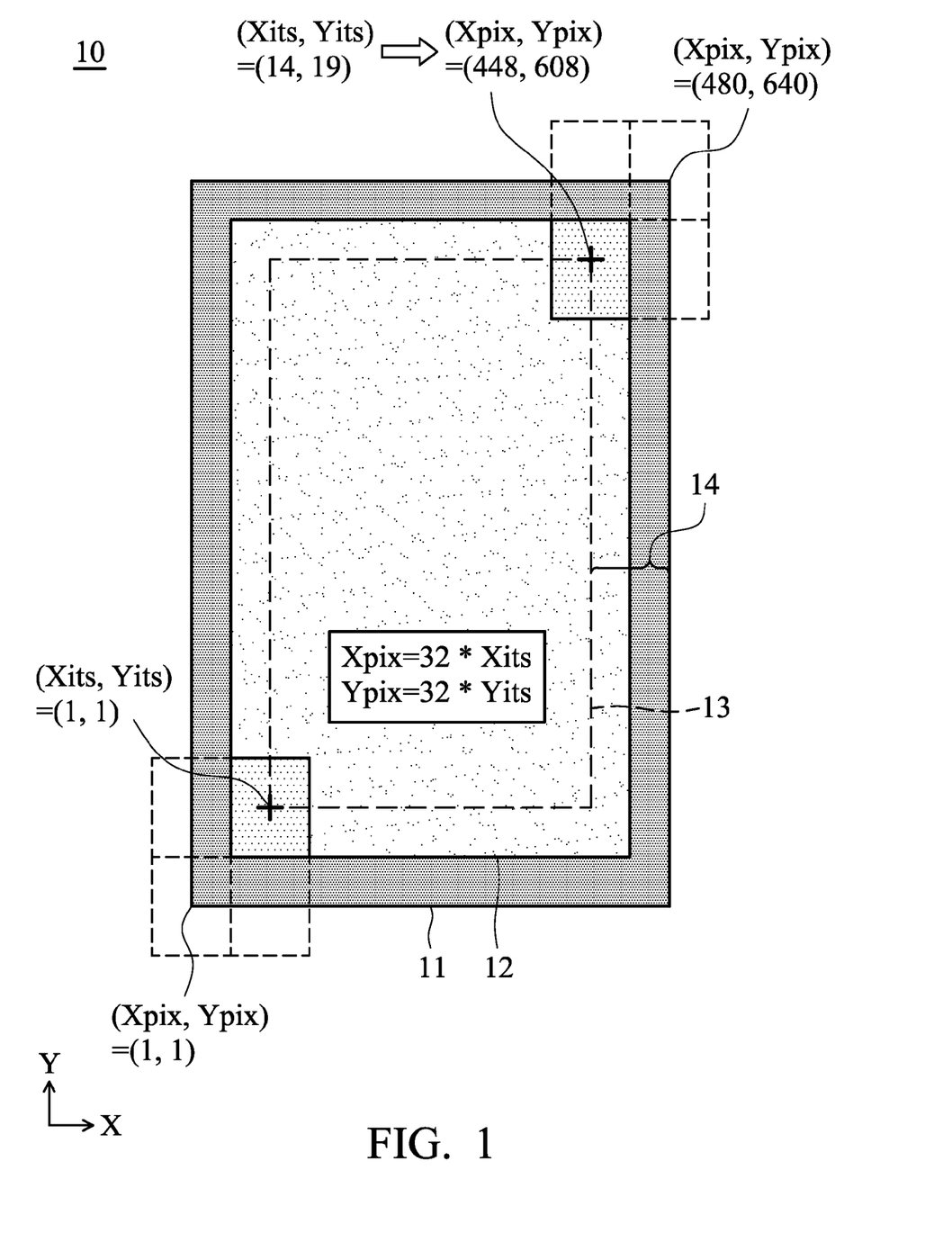
FIG. 1 is a schematic view showing an effective touch area of a touch panel according to prior art.

FIG. 1 is a schematic view showing an effective touch area of a touch panel according to prior art. The touch panel 10 comprises a plurality of pixels which is located over a pixel active area 11 and an in-cell touch sensor which is located over a touch sensor active area 12. For the reason described above, the touch sensor active area 12 is usually smaller than the pixel active area 11, as shown in FIG. 1.

In FIG. 1, VGA resolution (640×480) is taken as an example for the resolution of the touch panel 10. In the horizontal direction, there are 480 pixels arranged in a row. In the vertical direction, there are 640 pixels arranged in a column. If each pixel is given a coordinate to indicate its location, the pixel at the left bottom corner of the pixel active area 11 can be represented as (Xpix, Ypix)=(1, 1), and the pixel at the right top corner of the pixel active area 11 can be represented as (Xpix, Ypix)=(480, 640). Now regarding the in-cell touch sensor, in the horizontal direction, there are 14 column electrodes arranged in a row and in the vertical direction, there are 19 row electrodes arranged in a column. Similarly, if each intersection point of the column electrode and the row electrode is given a coordinate to indicate its location, the point at the left bottom corner of the touch sensor active area 12 can be represented as (Xits, Yits)=(1, 1), and the point at the right top corner of the touch sensor active area 12 can be represented as (Xits, Yits)=(14, 19). Note that the pixel at a corner is just located on the edge of the pixel active area 11, but the intersection point of the column electrode and the row electrode at a corner is located within the touch sensor active area 12. Therefore, the in-cell touch sensor comprises an effective touch area 13 which is located within the touch sensor active area 12. Because the pitch of the intersection point of the column electrode and the row electrode is 32 times the pitch of the pixel, the effective touch area 13, which is an area over a range (Xits: 1-14, Yits: 1-19), is equivalent to an area over a range (Xpix: 32-448, Ypix: 32-608). Accordingly, a region which is an inactive touch area 14 is located between the pixel active area 11 and touch sensor active area 12. As a result, a user cannot point out the edge area of a display panel by touch sensing. It is desirable that an effective touch area is equal to the pixel active area 11 such that a touch on the edge area of the display panel can be sensed more accurately.

The purpose of the invention is to enhance the finger touch pointing area and to improve the accuracy of the finger touch location on a touch panel.

BRIEF SUMMARY OF THE INVENTION

A detailed description is given in the following embodiments with reference to the accompanying drawings.

To achieve the above purposes, a touch detection method in accordance with an embodiment of the invention includes: scanning row electrodes or column electrodes of a touch sensor in sequence to obtain touch data of the touch sensor; labeling a plurality of coordinates as a touch image according to the touch data; mirror copying the touch data of the touch image corresponding to at least one column electrode and at least one row electrode which are adjacent to an edge of the pixel active area in the x-direction and the y-direction, respectively, to at least one corresponding location which is outside of the touch sensor active area with respect to the edge of the pixel active area; calculating a location ($x_{ave}$, $y_{ave}$) of the central point of the touch image by a weighted average; and outputting the location ($x_{ave}$, $y_{ave}$) of the central point of the touch image.

In the touch detection method, the at least one column electrode and the at least one row electrode which are adjacent to an edge of the pixel active area include the second column electrode and the second row electrode from the edge of the pixel active area.

In the touch detection method, the distance between the corresponding location which is outside of the touch sensor active area and the edge of the pixel active area is equal to the distance between the location where the touch data is copied and the edge of the pixel active area.

In the touch detection method, the location ($x_{ave}$, $y_{ave}$) of the central point of the touch image is calculated by the following formula, wherein $V_{x,y}$ is the touch data that is linked to capacitance of a touch level at a location (x, y), M is the number of column electrodes, and N is the number of row electrodes:

$$x_{ave} = \sum_{x=1}^{M} \sum_{y=1}^{N} (x_{mod} v_{x,y}) / \sum_{x=1}^{M} \sum_{y=1}^{N} (k v_{x,y}),$$

wherein:
$x_{mod}=1+(-1)=0$, k=2 (x=1);
$x_{mod}=M+(M+2)=2M+2$, k=2 (x=M); and
$x_{mod}=x$, k=1 (otherwise), and $$y_{ave} = \sum_{x=1}^{M} \sum_{y=1}^{N} (y_{mod} v_{x,y}) / \sum_{x=1}^{M} \sum_{y=1}^{N} (k v_{x,y}),$$

wherein:
$y_{mod}=1+(-1)=0$, k=2 (y=1);
$y_{mod}=N+(N+2)=2N+2$, k=2 (y=N); and
$y_{mod}=y$, k=1 (otherwise), and In the touch detection method, the calculation formula for 4 corners of the coordinate system is considered as a special case, wherein: when x=y=1, $x_{mod}=y_{mod}=0$, k=4; when x=M, y=1, $x_{mod}=4M+4$, $y_{mod}=0$, k=4; when x=1, y=N, $x_{mod}=0$, $y_{mod}=4N+4$, k=4; and when x=M, y=N, $x_{mod}=4M+4$, $y_{mod}=4N+4$, k=4.

In another embodiment, a touch sensor of the invention includes: a scanning device scanning row electrodes or column electrodes in sequence to obtain touch data of the touch sensor; and a calculation device including a labeling module labeling a plurality of coordinates as a touch image according to the touch data; a calculation module mirror copying the touch data of the touch image corresponding to at least one column electrode and at least one row electrode which are adjacent to an edge of the pixel active area in the x-direction and the y-direction, respectively, to at least one corresponding location which is outside of the touch sensor active area with respect to the edge of the pixel active area, and calculating a location ($x_{ave}$, $y_{ave}$) of the central point of the touch image by a weighted average; and an output module outputting the location ($x_{ave}$, $y_{ave}$) of the central point of the touch image.

In the touch sensor, the at least one column electrode and the at least one row electrode which are adjacent to an edge of the pixel active area include the second column electrode and the second row electrode from the edge of the pixel active area.

In the touch sensor, the distance between the corresponding location which is outside of the touch sensor active area and the edge of the pixel active area is equal to the distance between the location where the touch data is copied and the edge of the pixel active area.

In the touch sensor, the location ($x_{ave}$, $y_{ave}$) of the central point of the touch image is calculated by the following formula, wherein $V_{x,y}$ is the touch data that is linked to capacitance of a touch level at a location (x, y), M is the number of column electrodes, and N is the number of row electrodes:

$$x_{ave} = \sum_{x=1}^{M} \sum_{y=1}^{N} (x_{mod} v_{x,y}) / \sum_{x=1}^{M} \sum_{y=1}^{N} (k v_{x,y}),$$

wherein:
$x_{mod}=1+(-1)=0$, $k=2$ (x=1);
$x_{mod}=M+(M+2)=2M+2$, $k=2$ (x=M); and
$x_{mod}=x$, $k=1$ (otherwise), and $$y_{ave} = \sum_{x=1}^{M} \sum_{y=1}^{N} (y_{mod} v_{x,y}) / \sum_{x=1}^{M} \sum_{y=1}^{N} (k v_{x,y}),$$

wherein:
$y_{mod}=1+(-1)=0$, $k=2$ (y=1);
$y_{mod}=N+(N+2)=2N+2$, $k=2$ (y=N); and
$y_{mod}=y$, $k=1$ (otherwise), and In the touch sensor, the calculation formula for 4 corners of the coordinate system is considered as a special case, wherein: when x=y=1, $x_{mod}=y_{mod}=0$, k=4; when x=M, y=1, $x_{mod}=4M+4$, $y_{mod}=0$, k=4; when x=1, y=N, $x_{mod}=0$, $y_{mod}=4N+4$, k=4; and when x=M, y=N, $x_{mod}=4M+4$, $y_{mod}=4N+4$, k=4.

In another embodiment, a liquid crystal display device including the touch sensor described is provided.

According to the embodiments, a touch detection method, a touch sensor, and a liquid crystal display device, which uses an in-cell touch sensor touch area enhancing algorithm to enhance the finger touch pointing area and to improve the accuracy of the finger touch location on the touch panel, are provided.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
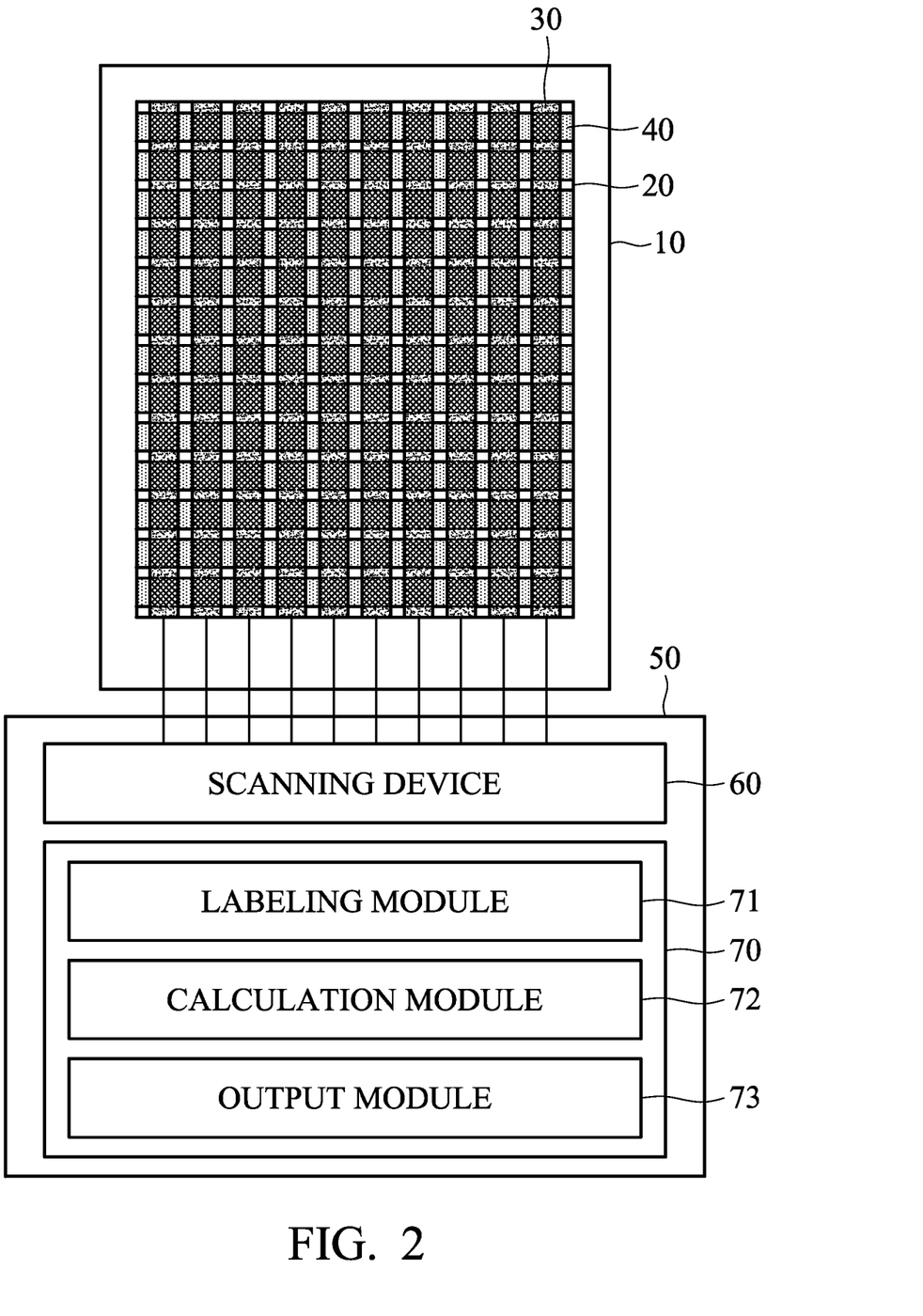
FIG. 2 is a block diagram showing the entire structure of a touch panel and a touch sensor controller according to an embodiment of the invention.

FIG. 2 is a block diagram showing the entire structure of a touch panel and a touch sensor controller according to an embodiment of the invention. In FIG. 1, the touch panel 10 comprises a touch sensor 20 comprising a plurality of column electrodes (also called X sensor electrodes) 30 and a plurality of row electrodes (also called Y sensor electrodes) 40, and the touch sensor controller 50 comprises a scanning device 60 and a calculation device 70. The calculation device 70 further comprises a labeling module 71, a calculation module 72, and an output module 73.

The touch sensor 20 can be a projected capacitive touch sensor. The projected capacitive touch sensor uses one of the column electrode 30 and the row electrode 40 as a driving electrode and a signal receiving electrode, respectively. A driving pulse is supplied from the driving electrode and a touch onto a touch panel surface is detected by measuring the amount of current flowing at the time when a conductor such as a finger touches the touch panel surface.

The column electrodes 30 is used to detect the touch location in the horizontal direction and arranged along the vertical direction in parallel. The row electrodes 40 is used to detect the touch location in the vertical direction and arranged along the horizontal direction in parallel.

The touch sensor controller 50 is used to control the touch sensor 20. In the touch sensor controller 50, the scanning device 60 electrically drives the touch sensor 20, by supplying the driving pulse, scanning the column electrode 30 or the row electrode 40, and acquiring touch data such as the capacitance of the column electrode 30 or the row electrode 40. The calculation device 70 is used to process various calculations. In the calculation device 70, the labeling module 71 labels a plurality of locations as a touch image according to the touch data, and the calculation module 72 calculates the location of the touch image, and the output module outputs the location data of the touch image. Here, the touch sensor controller 50 can be realized by a CPU, an ASIC, or other IC chips.

Figure 3:
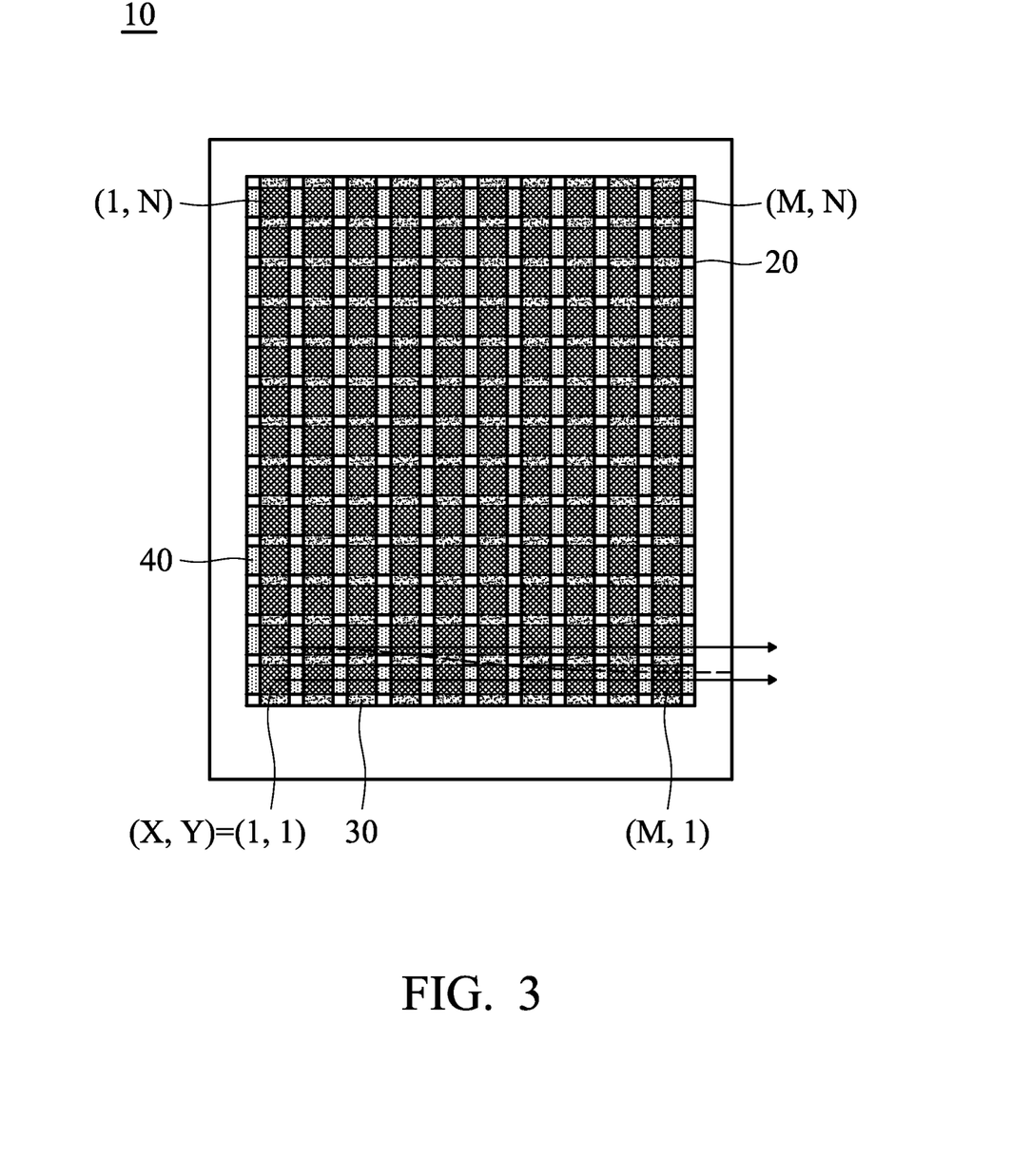
FIG. 3 is diagram showing the inner structure of the touch panel shown in FIG. 2.

FIG. 3 is diagram showing the inner structure of the touch panel 10. As the description above, the column electrodes 30, which extend in the vertical direction, and the row electrodes 40, which extend in the horizontal direction, are arranged in a form of a matrix in the touch sensor 20. In FIG. 2, there are M column electrodes 30 and N row electrodes 40. Therefore, an M×N matrix (M columns and N rows) is formed. Following, a coordinate system is set corresponding to the matrix such that the left bottom corner (X, Y) is (1, 1), the right bottom corner (X, Y) is (M, 1), the left top corner (X, Y) is (1, N), and the right top corner (X, Y) is (M, N). When the touch sensor is scanned, the row electrodes 40 are scanned from the bottom to the top. The touch data are read out in the sequence of (1, 1)→(2, 1)→ ... (M, 1)→(1, 2)→ ... (M−1, N)→(M, N). As a result, the touch data of all coordinates of the touch sensor 20 are read out.

Figure 4:
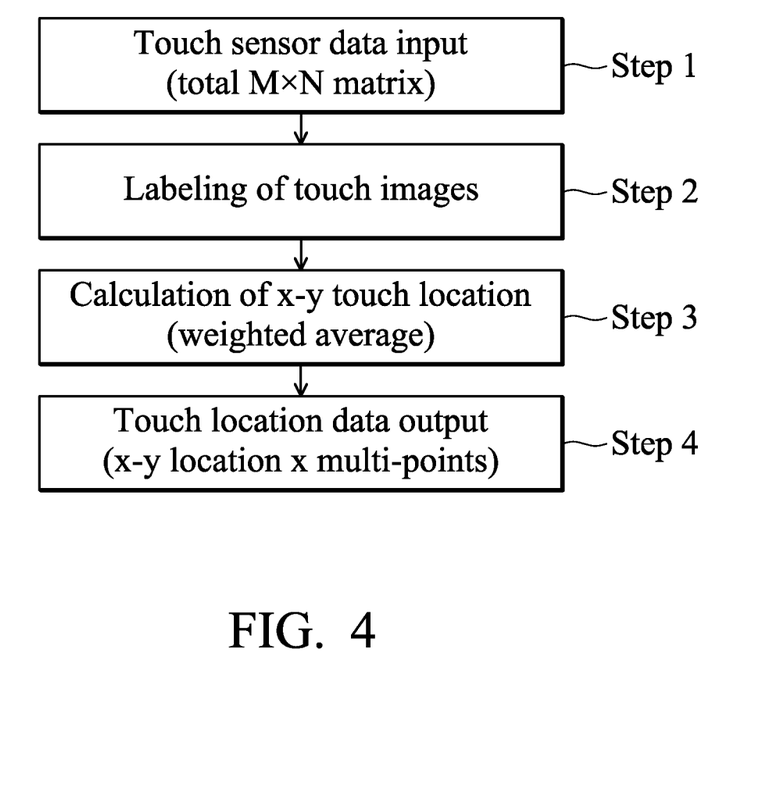
FIG. 4 is a flow chart showing touch detection of a touch sensor.

FIG. 4 is a flow chart showing touch detection of a touch sensor. In FIG. 4, there are four basic steps for touch detection. Also refer to FIG. 2. In step 1, the scanning device 60 scans the touch sensor 10 to acquire the touch data of all coordinates. In step 2, the labeling module 71 labels the touch images. In step 3, the calculation module 72 calculates the location of the touch image by a weighted average. In step 4, the output module 73 outputs the location data of the touch image. In the present invention, a new algorithm is adopted in step 3.

Figure 5:
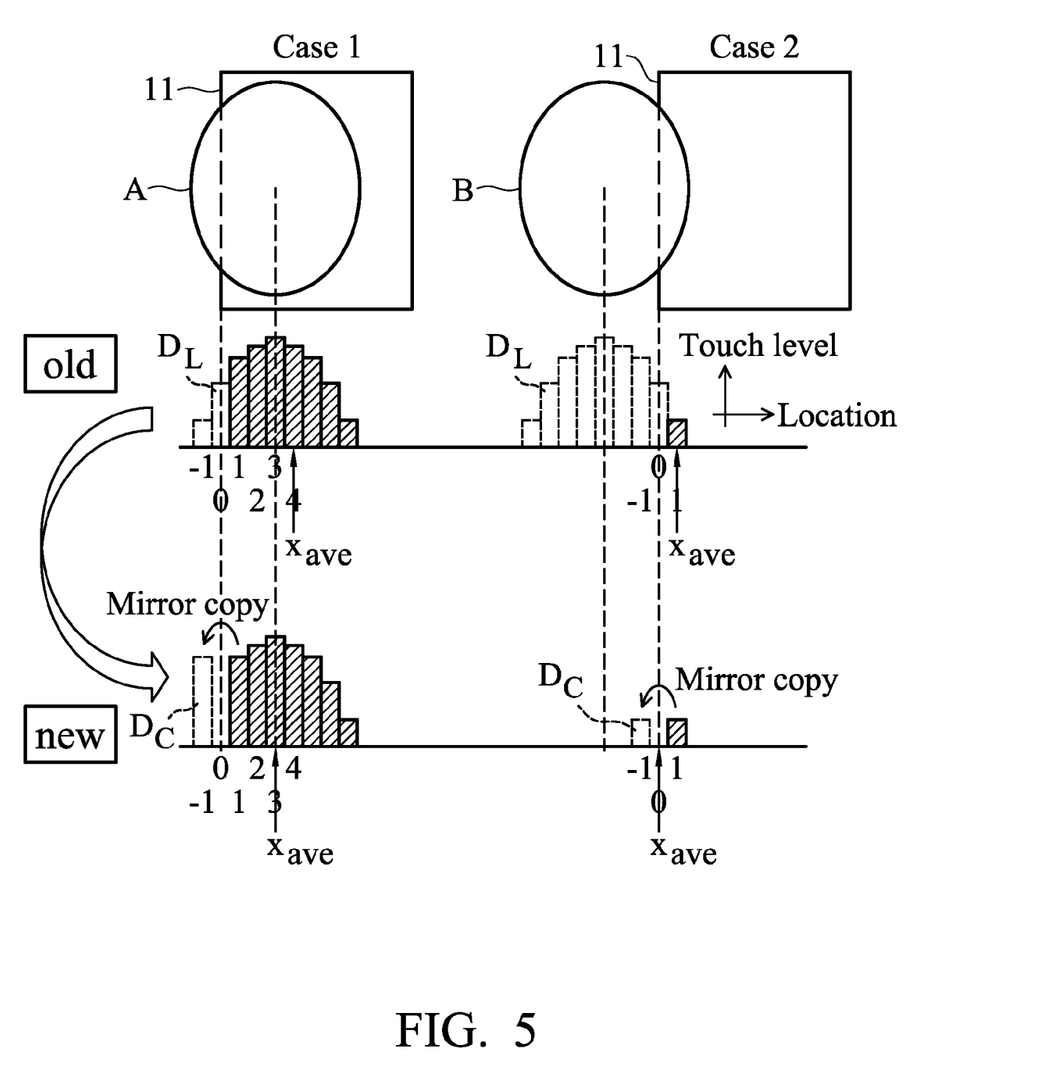
FIG. 5 is a diagram showing touch detection of a display panel applied with a conventional algorithm and an algorithm of the invention respectively in the situation where the finger touch is located across the left edge of a pixel active area.
Figure 6:
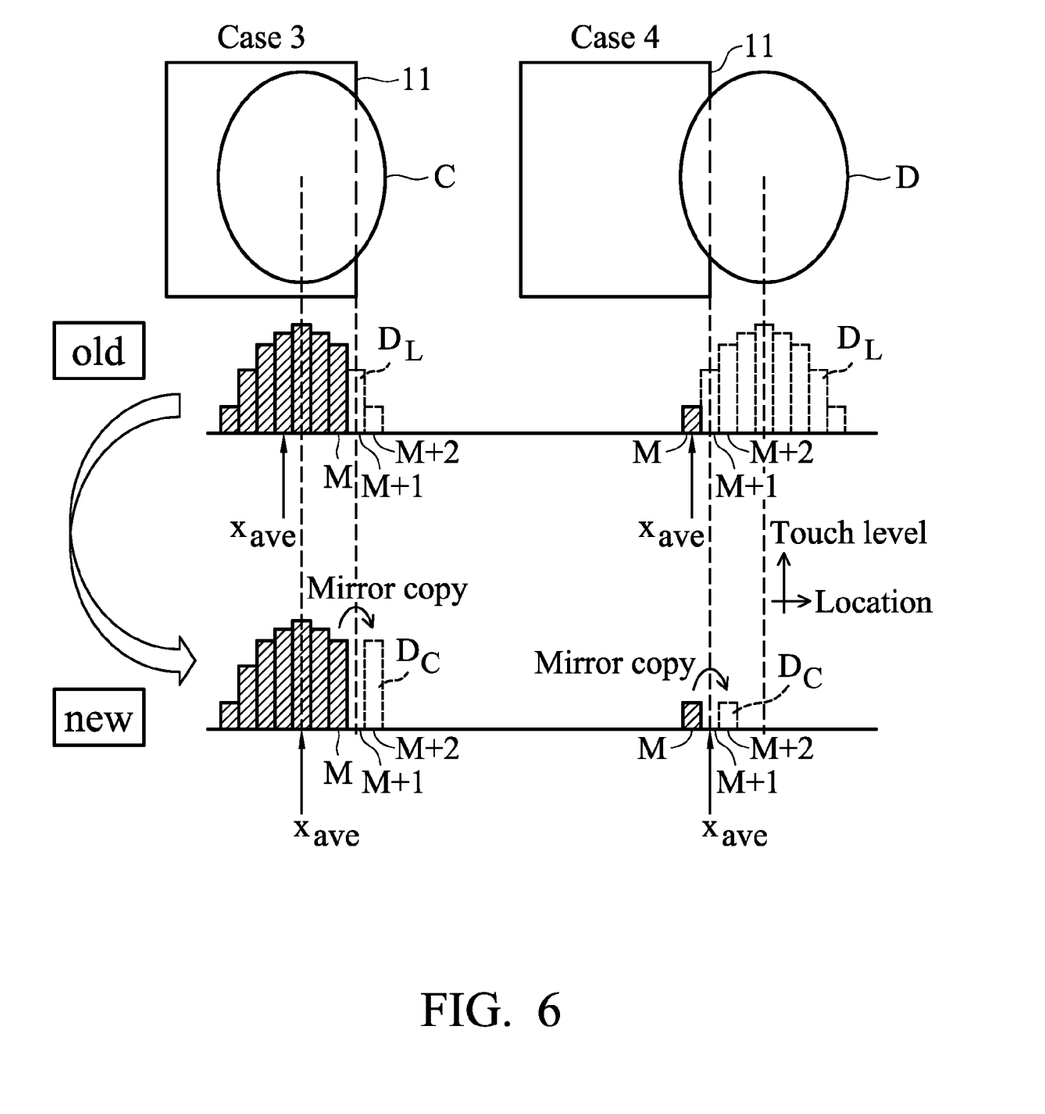
FIG. 6 is a diagram showing touch detection of a display panel applied with a conventional algorithm and an algorithm of the invention respectively in the situation where the finger touch is located across the right edge of a pixel active area.

FIG. 5 is a diagram showing touch detection of a display panel applied with a conventional algorithm and an algorithm of the invention respectively in the situation where a finger touch is located across the left edge of a pixel active area. FIG. 6 is a diagram showing touch detection of a display panel applied with a conventional algorithm and an algorithm of the invention respectively in the situation where a finger touch is located across the right edge of a pixel active area.

As described above, the location of the touch image is calculated by a weighted average. Note that the location of the touch image means the location of the central point of the touch image. In FIGS. 5 and 6, the touch detection of the location of the touch image in the horizontal direction is taken as an example, wherein the x-axis represents a horizontal location which corresponds to the location of the column electrode and the y-axis represents touch level. The touch level is proportional to the amount of capacitance which is detected by a column electrode. The more the coordinates (intersection points) on a column electrode are touched the larger the amount of capacitance on the column electrode is generated.

Regarding case 1, a finger touches the touch panel and forms a touched area A, wherein a small part of the touched area A is located outside of the pixel active area 11. When the conventional algorithm is used in a weighted average calculation, because a part of the touched area A is located outside of the touch sensor active area (the location 1 is the left edge of the touch sensor active area), a part of touch data (lost data $D_L$) which corresponds to a part of the touch image located just on the left edge of the pixel active area 11 (the location 0) and outside of the pixel active area 11 (the location −1) are lost. Therefore, only the remaining touch data is calculated for the weighted average calculation. As a result, the average location $X_{ave}$ does not precisely fall on the location of the central point of the touch image and is located at a right side of the location of the central point of the touch image (about the location 4 in FIG. 5).

In consideration of the above problem, the method of the invention mirror copies the touch data of the touch image at the left edge of the touch sensor active area, namely, the touch data at the location 1, to a corresponding location (the location −1) outside of the touch sensor active area with respect to the left edge of the pixel active area 11 (the location 0). Then, the remaining touch data and the touch data at the location −1 which is copied from the touch data at the location 1 are weighted average calculated. As a result, the average location $X_{ave}$ will fall on almost the exact location of the central point of the touch image. The accuracy of the average location $X_{ave}$ is improved. Specifically, the touch data at the location −1 substantially compensates for the lost data $D_L$. Here, the touch data at the location −1 is called compensated data $D_C$ for representation.

Regarding case 2, a finger touches the touch panel and forms a touched area B, wherein a large part of the touched area B is located outside of the pixel active area 11. When the conventional algorithm is used in a weighted average calculation, because a large part of the touched area B is located outside of the touch sensor active area, a large part of the touch data are lost and only the touch data at the location 1 is remaining. Therefore, the average location $X_{ave}$ will fall on the location 1.

When the algorithm of the invention is used in a weighted average calculation, the touch data at the location 1 is mirror copied to the location −1 with respect to the location 0. Then the touch data at the location 1 and the touch data at the location −1 which is the compensated data $D_C$ are weighted average calculated. As a result, the average location $X_{ave}$ will fall on the location 0 which is the left edge of the pixel active area 11.

Therefore, whether in case 1 or case 2, the average location $X_{ave}$ calculated by the algorithm of the invention is modified and moves toward the left side in comparison with the average location $X_{ave}$ calculated by the conventional algorithm as long as the touched area formed by a finger is located across the left edge of the pixel active area. From case 2, it is understood that the effective finger touch area can be enlarged to be the pixel active area.

Regarding case 3, a finger touches the touch panel and forms a touched area C, wherein a small part of the touched area C is located outside of the pixel active area 11. When the conventional algorithm is used in a weighted average calculation, because a part of the touched area C is located outside of the touch sensor active area (the location M is the right edge of the touch sensor active area), a part of touch data (lost data $D_L$) which corresponds to a part of the touch image located just on the right edge of the pixel active area 11 (the location M+1) and outside of the pixel active area 11 (the location M+2) are lost. Therefore, only the remaining touch data is weighted average calculated. As a result, the average location $X_{ave}$ will not precisely fall on the location of the central point of the touch image and be located at the left side of the location of the central point of the touch image.

The method of the invention is to mirror copy the touch data of the touch image at the right edge of the touch sensor active area, namely, the touch data at the location M, to a corresponding location (the location M+2) outside of the touch sensor active area with respect to the right edge of the pixel active area 11 (the location M+1). Then, the remaining touch data and the touch data at the location M+2 which is copied from the touch data at the location M are weighted average calculated. As a result, the average location $X_{ave}$ will fall on almost the exact location of the central point of the touch image. The accuracy of the average location $X_{ave}$ is improved. Specifically, the touch data at the location M+2 substantially compensates for the lost data $D_L$. Here, the touch data at the location M+2 is called compensated data $D_C$ for representation.

Regarding case 4, a finger touches the touch panel and forms a touched area D, wherein a large part of the touched area D is located outside of the pixel active area 11. When the conventional algorithm is used in a weighted average calculation, because a large part of the touched area D is located outside of the touch sensor active area, a large part of the touch data are lost and only the touch data at the location M is remaining. Therefore, the average location $X_{ave}$ will fall on the location M.

When the algorithm of the invention is used in a weighted average calculation, the touch data at the location M is mirror copied to the location M+2 with respect to the location M. Then the touch data at the location M and the touch data at the location M+2 which is the compensated data $D_C$ are weighted average calculated. As a result, the average location $X_{ave}$ will fall on the location M+1 which is the right edge of the pixel active area 11.

Therefore, whether in case 3 or case 4, the average location $X_{ave}$ calculated by the algorithm of the invention is modified and moves toward the right side in comparison with the average location $X_{ave}$ calculated by the conventional algorithm as long as the touched area formed by a finger is located across the right edge of the pixel active area. From case 4, it is also understood that the effective finger touch area can be enlarged to be the pixel active area.

Based on the embodiments shown in FIGS. 5 and 6, two sets of weighted average formulas which correspond to the conventional algorithm and the algorithm of the invention can be described respectively as follows, wherein formulas (1) and (2) are conventional weighted average formulas, and formulas (3) and (4) are new weighted average formulas in accordance with the invention.

$$x_{ave} = \sum_{x=1}^{M} \sum_{y=1}^{N} (xv_{x,y}) / \sum_{x=1}^{M} \sum_{y=1}^{N} (v_{x,y}) \quad (1)$$

$$y_{ave} = \sum_{x=1}^{M} \sum_{y=1}^{N} (yv_{x,y}) / \sum_{x=1}^{M} \sum_{y=1}^{N} (v_{x,y}) \quad (2)$$

where:
$X_{ave}$ is the averaged x location of a touch in touch sensor coordinate system;
$Y_{ave}$ is the averaged y location of a touch in touch sensor coordinate system;
M is the number of the column electrodes (or the x sensor electrodes);
N is the number of the row electrodes (or the y sensor electrodes); and
$V_{x,y}$ is the touch data that is linked to capacitance of a touch level at a location (x, y).

$$x_{ave} = \sum_{x=1}^{M} \sum_{y=1}^{N} (x_{mod}v_{x,y}) / \sum_{x=1}^{M} \sum_{y=1}^{N} (kv_{x,y}) \quad (3)$$

where:
$x_{mod}$=1+(−1)=0, k=2 (x=1);
$x_{mod}$=M+(M+2)=2M+2, k=2 (x=M); and
$x_{mod}$=x, k=1 (otherwise), and $$y_{ave} = \sum_{x=1}^{M} \sum_{y=1}^{N} (y_{mod}v_{x,y}) / \sum_{x=1}^{M} \sum_{y=1}^{N} (kv_{x,y}) \quad (4)$$

where:
$y_{mod}$=1+(−1)=0, k=2 (y=1);
$y_{mod}$=N+(N+2)=2N+2, k=2 (y=N); and
$y_{mod}$=y, k=1 (otherwise).

In formula (3), a variable x is modified to $x_{mod}$ and a parameter k is added to the formula in comparison with formula (1), wherein there are three cases, x=1, x=M, and x≠1 or M, to determine $x_{mod}$ and k. If x is 1, $x_{mod}$ is 0, which is the sum of 1 and (−1), wherein (−1) means the location of the compensated touch data, and k is 2, which means double weighting for v. If x is M, $x_{mod}$ is 2M+2, which is the sum of M and (M+2), wherein (M+2) means the location of the compensated touch data, and k is 2, which means double weighting for v. If x is not 1 or M, $x_{mod}$ is x and k is 1, so that the formula (3) is the conventional weighted average formula (1). The case of formula (4) is identical to that of formula (3). Therefore, the explanation for formula (4) is not described again.

According to the above description, briefly speaking, the first and last line of x, y of the touch data is treated as 2 lines of data in that a mirror-copied line data comes from the line symmetric x, y location with respect to the pixel edge.

In addition, the 4 corners of the touch sensor active area can be further treated as special cases to enhance the touch detection at the corners of the touch panel. In an embodiment, if x=y=1, $x_{mod}$=$y_{mod}$=0, and k=4, and if x=M, y=1, $x_{mod}$=4M+4, $y_{mod}$=0, and k=4, and if x=1, y=N, $x_{mod}$=0, $y_{mod}$=4N+4, and k=4, and if x=M, y=N, $x_{mod}$=4M+4, $y_{mod}$=4N+4, and k=4. In these cases, the touch data at the first and the second line adjacent to the edge of the pixel active area are both copied. Therefore, k is 4 so as to quadruple the weighting for v.

In the embodiments, mirror copying the touch data at the first line or the last line is described, but the invention is not limited thereto. Mirror copying the touch data at the other lines or a plurality of lines is possible, which depends on requirements or designs.

Figure 7A:
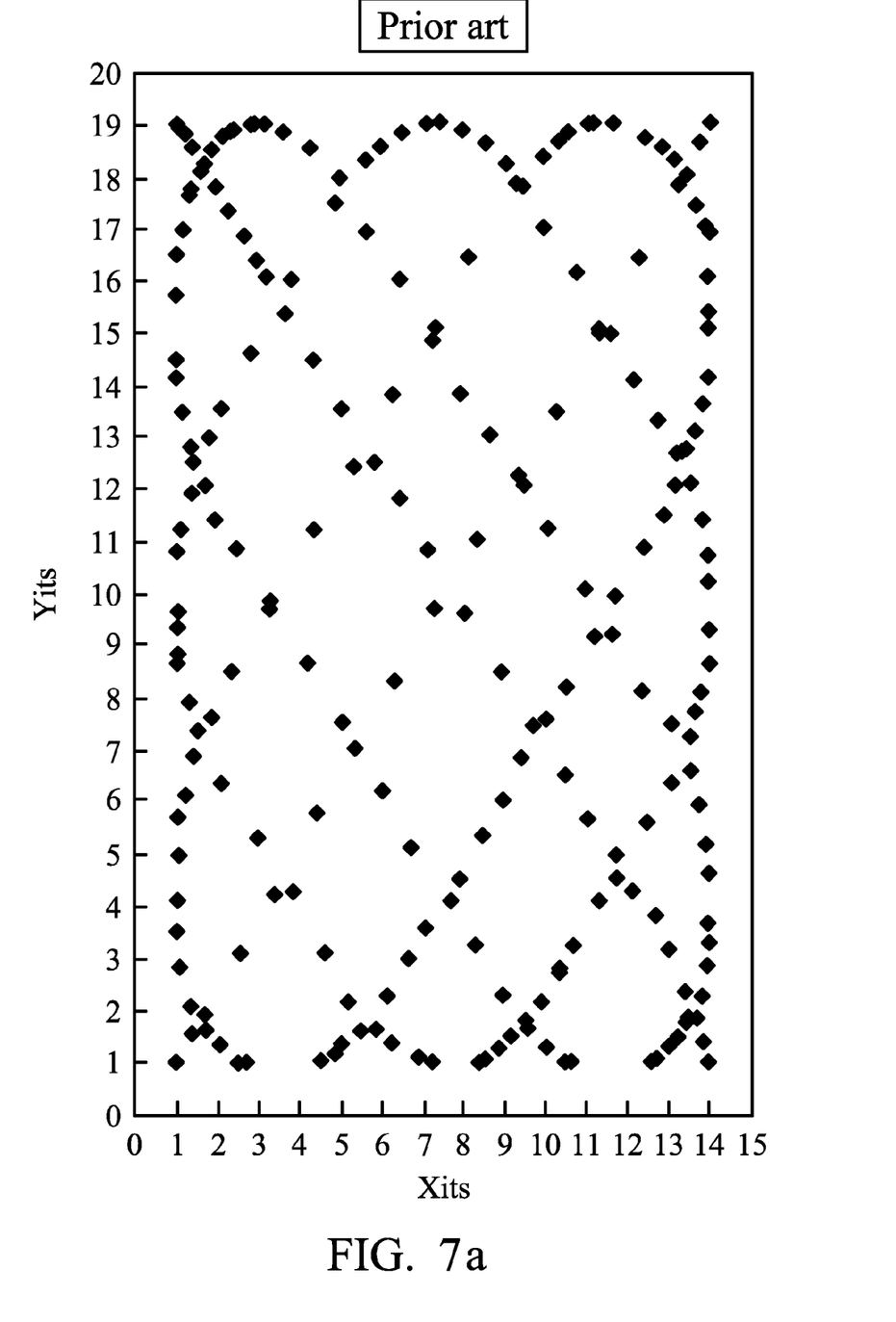
FIG. 7a is a pointing accuracy map for a conventional algorithm.
Figure 7B:
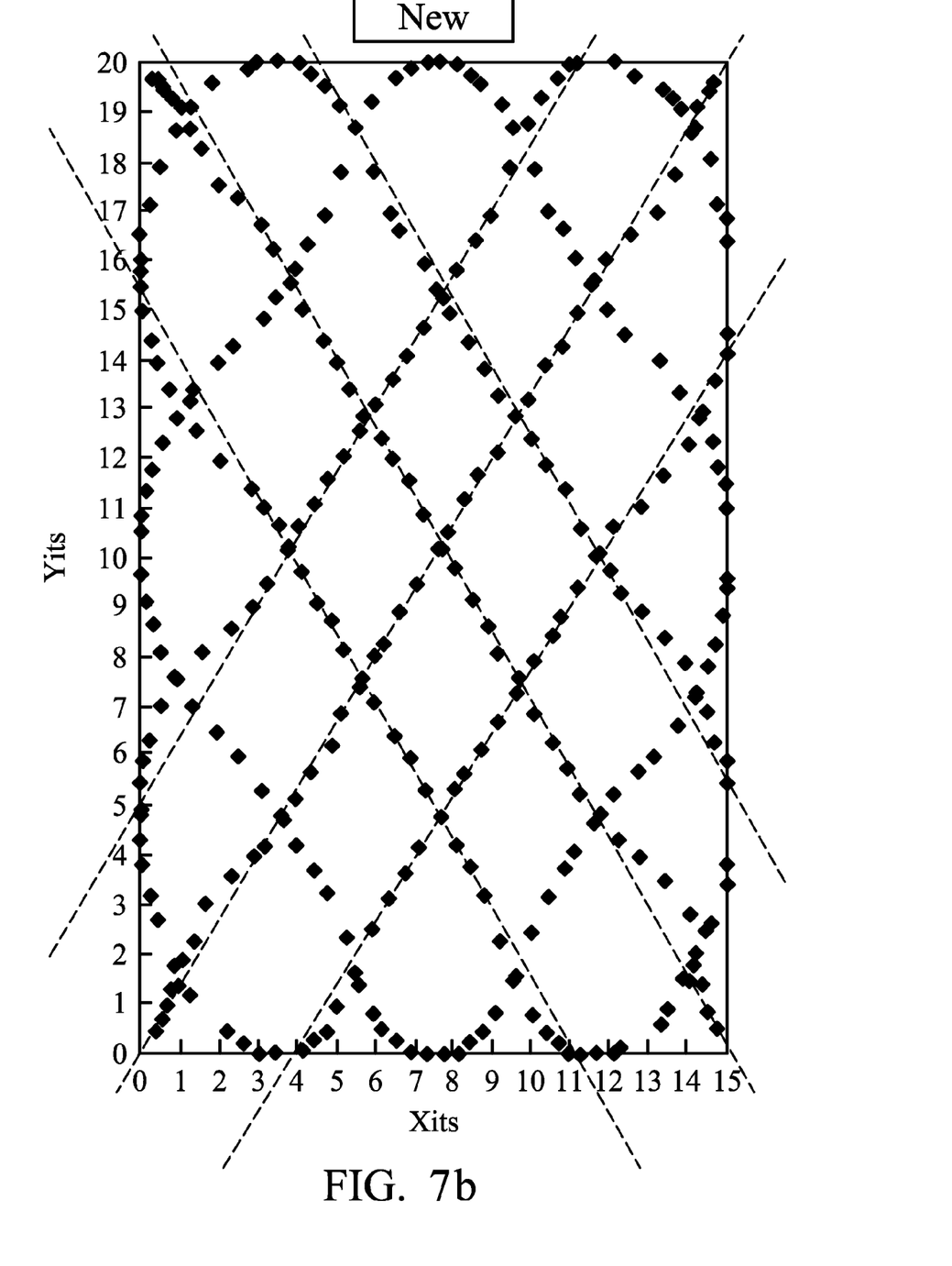
FIG. 7b is a pointing accuracy map for an algorithm of the invention.

FIG. 7a is a pointing accuracy map for a conventional algorithm and FIG. 7b is a pointing accuracy map for an algorithm of the invention. The x-axis represents column electrode coordinates and the y-axis represents row electrode coordinates. The points on the maps mean the locations that are detected by the touch sensor. In FIG. 7b, the boundary of the points is just on x=0, x=15, y=0, and y=20. Therefore, the pointing available zone has been enlarged to a range (Xits: 0-15, Yits: 0-20) which is equivalent to a range (Xpix: 0-480, Ypix: 0-640). That is, the effective touch area is equal to the pixel active area such that a touch on the edge area of the display panel can be sensed more accurately. In addition, the present invention uses a new and simple algorithm to enhance the touch area, therefore no extra device or chip is added with respect to prior art. A real time calculation with small IC costs is available.

While the invention has been described by way of example and in terms of the preferred embodiments, it is to be understood that the invention is not limited to be the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch detection method, comprising:

scanning row electrodes or column electrodes of a touch sensor in sequence to obtain touch data of the touch sensor;

labeling a plurality of coordinates as a touch image according to the touch data;

mirror copying the touch data of the touch image corresponding to at least one column electrode and at least one row electrode which are adjacent to an edge of the pixel active area in the x-direction and the y-direction, respectively, to at least one corresponding location which is outside of the touch sensor active area with respect to the edge of the pixel active area;

calculating a location ($x_{ave}$, $y_{ave}$) of the central point of the touch image by a weighted average; and outputting the location ($x_{ave}$, $y_{ave}$) of the central point of the touch image, wherein in the case where touch data of the touch image corresponding to only the first column electrode from the edge of the pixel active area and only the first row electrode from the edge of the pixel active area are mirror-copied, the location ($x_{ave}$, $y_{ave}$) of the central point of the touch image is calculated by the following formula, wherein $V_{x,y}$ is the touch data that is linked to capacitance of a touch level at a location (x, y), M is the number of column electrodes, and N is the number of row electrodes:

$$x_{ave} = \sum_{x=1}^{M} \sum_{y=1}^{N} (x_{mod} v_{x,y}) / \sum_{x=1}^{M} \sum_{y=1}^{N} (k v_{x,y}),$$

wherein:
if x=1, then $x_{mod}$=1+(−1)=0, and k=2;
if x=M, then $x_{mod}$=M+(M+2)=2M+2, and k=2; and
if x≠1 and x≠M, then $x_{mod}$=x, and k=1, and $$y_{ave} = \sum_{x=1}^{M} \sum_{y=1}^{N} (y_{mod} v_{x,y}) / \sum_{x=1}^{M} \sum_{y=1}^{N} (k v_{x,y}),$$

wherein:
if y=1, then $y_{mod}$=1+(−1)=0, and k=2;
if y=N then $y_{mod}$=N+(N+2)=2N+2, and k=2; and
if y≠1 and y≠N, then $y_{mod}$=y, and k=1.

2. The touch detection method as claimed in claim 1, wherein the distance between the corresponding location which is outside of the touch sensor active area and the edge of the pixel active area is equal to the distance between the location where the touch data is copied and the edge of the pixel active area.

3. The touch detection method as claimed in claim 1, wherein the calculation formula for 4 corners of the coordinate system is considered as a special case, wherein:
x=y=1, then $x_{mod}$=$y_{mod}$=0, and k=4;
x=M, y=1, then $x_{mod}$=4M+4, $y_{mod}$=0, and k=4;
x=1, y=N, then $x_{mod}$=0, $y_{mod}$=4N+4, and k=4; and
x=M, y=N, then $x_{mod}$=4M+4, $y_{mod}$=4N+4, and k=4.

4. A touch sensor, comprising:

a scanning device scanning row electrodes or column electrodes in sequence to obtain touch data of the touch sensor; and a calculation device comprising:

a labeling module labeling a plurality of coordinates as a touch image according to the touch data;

a calculation module mirror copying the touch data of the touch image corresponding to at least one column electrode and at least one row electrode which are adjacent to an edge of the pixel active area in the x-direction and the y-direction, respectively, to at least one corresponding location which is outside of the touch sensor active area with respect to the edge of the pixel active area, and calculating a location ($x_{ave}$, $y_{ave}$) of the central point of the touch image by a weighted average; and an output module outputting the location ($x_{ave}$, $y_{ave}$) of the central point of the touch image, wherein in the case where touch data of the touch image corresponding to only the first column electrode from the edge of the pixel active area and only the first row electrode from the edge of the pixel active area are mirror-copied, the location ($x_{ave}$, $y_{ave}$) of the central point of the touch image is calculated by the following formula, wherein $V_{x,y}$ is the touch data that is linked to capacitance of a touch level at a location (x, y), M is the number of column electrodes, and N is the number of row electrodes:

$$x_{ave} = \sum_{x=1}^{M} \sum_{y=1}^{N} (x_{mod} v_{x,y}) / \sum_{x=1}^{M} \sum_{y=1}^{N} (k v_{x,y}),$$

wherein:
if x=1, then $x_{mod}$=1+(−1)=0, and k=2;
if x=M, then $x_{mod}$=M+(M+2)=2M+2, and k=2; and
if x≠1 and x≠M, then $x_{mod}$=x, and k=1, and $$y_{ave} = \sum_{x=1}^{M} \sum_{y=1}^{N} (y_{mod} v_{x,y}) / \sum_{x=1}^{M} \sum_{y=1}^{N} (k v_{x,y}),$$

wherein:
if y=1, then $y_{mod}$=1+(−1)=0, and k=2;
if y=N, then $y_{mod}$=N+(N+2)=2N+2, and k=2; and
if y≠1 and y≠N, then $y_{mod}$=y, and k=1.

5. The touch sensor as claimed in claim 4, wherein the distance between the corresponding location which is outside of the touch sensor active area and the edge of the pixel active area is equal to the distance between the location where the touch data is copied and the edge of the pixel active area.

6. The touch sensor as claimed in claim 4, wherein the calculation formula for 4 corners of the coordinate system is considered as a special case, wherein:
if x=y=1, then $x_{mod}$=$y_{mod}$=0, and k=4;
if x=M, y=1, then $x_{mod}$=4M+4, $y_{mod}$=0, and k=4;
if x=1, y=N, then $x_{mod}$=0, $y_{mod}$=4N+4, and k=4; and
if x=M, y=N, then $x_{mod}$=4M+4, $y_{mod}$=4N+4, and k=4.

* * * * *